3,496,498
HIGH-FREQUENCY FILTER
Takeshi Kawahashi and Takaji Kuroda, Tokyo, Japan, assignors to Nippon Electric Company, Limited, Minato-ku, Tokyo-to, Japan, a Japanese corporation
Filed Aug. 8, 1966, Ser. No. 570,863
Claims priority, application Japan, Aug. 11, 1965, 40/48,895
Int. Cl. H03h 7/08
U.S. Cl. 333—73
4 Claims

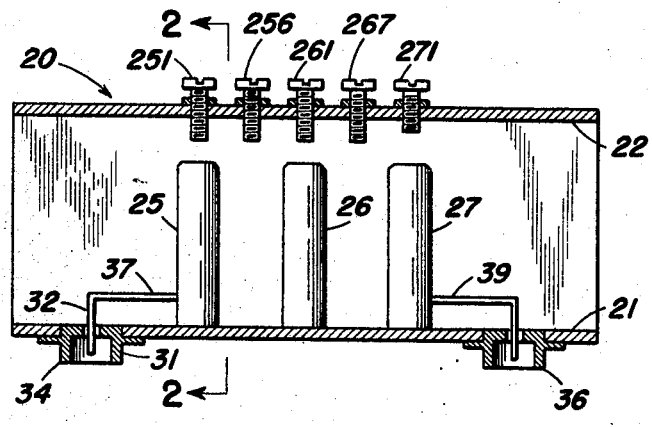
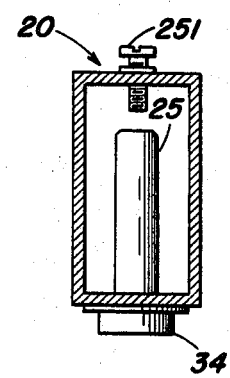
Fig. 1.    Fig. 2.
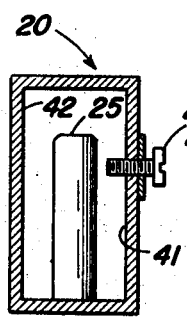
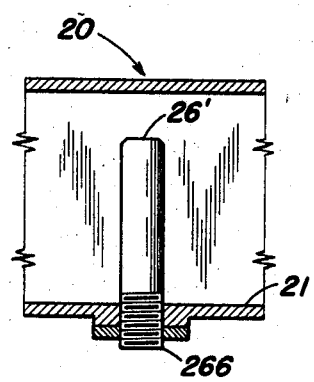
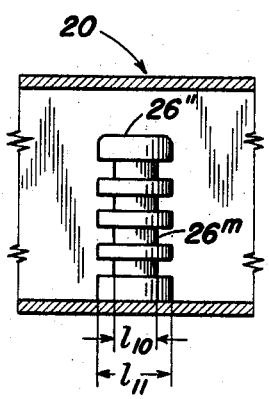
Fig. 3.    Fig. 4.    Fig. 5.
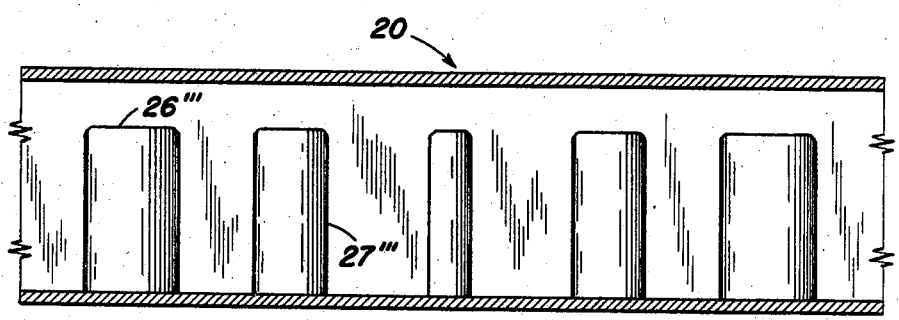
Fig. 6.
INVENTORS
Takeshi Kawahashi
Takaji Kuroda
BY *Marn & Jangarathis*
ATTORNEYS United States Patent Office 3,496,498
Patented Feb. 17, 1970

ABSTRACT OF THE DISCLOSURE

Microwave filter apparatus is provided according to the teachings of the present invention wherein a hollow waveguide having a predetermined cut-off frequency band and a plurality of conductive rods disposed perpendicularly in a spaced relation along the length of a broad wall thereof forms filter apparatus which is relatively small in size and inexpensive to manufacture. According to one embodiment of the instant invention, each of the conductive rods present in said filter apparatus includes one or more annular grooves therein whereby the electric length and hence the resonant frequency of the resonant circuit formed by each of said conductive rods may be determined. Thus in this embodiment, the groove or grooves in each of said conductive rods serve to equivalently lengthen the axial length of the rod whereby the resulting filter apparatus is substantially reduced in size.

This invention relates to a microwave filter, and more specifically to such filter comprising a hollow waveguide and a plurality of quarter wavelength rods disposed interiorly thereof. Tuning screws may be used with the rods as desired.

In a UHF frequency band having a center frequency of the order of 2,000 mc., a waveguide filter has very large physical dimensions. Such waveguide filter becomes quite cumbersome for use in frequency bands having center frequencies lower than 2000 mc. On the other hand, a coaxial cavity resonator or the like used widely as a filter in the latter frequency bands because of its small physical size is very difficult to assemble, requiring many man-hours for its manufacture.

The object of the present invention is therefore to provide a high-frequency filter which comprises a microwave circuit and which is small in size, easy to manufacture, cheap in cost, and has excellent characteristics.

According to a specific embodiment of the present invention, there is provided a high-frequency filter comprising: a waveguide or similar tube which is made, at least at the inside surface portion of electric conductive material; and a plurality of quarter wavelength resonator rods each of which is made, at least at the surface portion, of electric conductive material. Each rod has an electric length equal to a quarter of a wavelength selected within the cut-off frequency band of the tube. This length may be double, or triple, or the like multiple of such quarter wavelength, i.e., equal to an integral multiple thereof. These rods are disposed within the waveguide or tube in an array along the axis of the waveguide or tube in an intersecting relation to the axis thereof whereby the pass band of the filter includes a frequency band containing the above-mentioned wavelength. As a consequence, it is possible to use a waveguide or equivalent tube in whose cut-off frequency band the pass band of the filter lies and thereby to make the physical dimensions of the filter small.

The instant invention is readily understood from the following description taken together with the accompanying drawings, in which:

FIG. 1 is a longitudinal sectional view of a specific embodiment of the invention;

FIG. 2 is a cross-sectional view taken on line 2—2 of FIG. 1;

FIG. 3 is a cross-sectional view, similar to FIG. 2, showing a second embodiment of the invention in FIGS. 1 and 2;

FIG. 4 is a partial longitudinal sectional view showing a third embodiment of the invention in FIGS. 1 and 2;

FIG. 5 is a partial longitudinal sectional view showing a fourth embodiment of the invention in FIGS. 1 and 2;

FIG. 6 is a partial longitudinal sectional view similar to FIG. 1 and showing a fifth embodiment of the invention in FIGS. 1 and 2;

Figure 7:
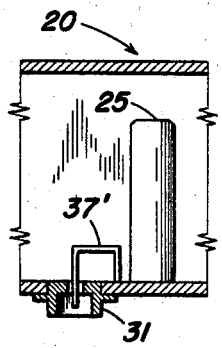
FIGS. 7 through 10 are partial longitudinal sectional views illustrating modifications of the input and output coupling connections in FIG. 1.

Referring to FIGS. 1 and 2, a specific embodiment of this invention comprises: a rectangular waveguide 20 in whose cut-off frequency band the pass band of the filter lies (a rectangular waveguide IEC–R–60, IEC–R–40, or the like for a pass band of the 2000-mc. band); and a plurality of quarter-wavelength resonator rods 25, 26, 27, each having a length of about a quarter of the center wavelength of the pass band and a diameter of about one-tenth of the center wavelength of the pass band. These rods are supported by and inwardly perpendicularly projected from wall 21, in an intersecting relation to the axis of waveguide 20. The rods are also disposed in a parallel array along the axis of waveguide 20 with a preferred spacing therebetween of from one-twelfth to three-eights of the center wavelength of the pass band. The resonator rods form resonance circuits for the electromagnetic wave of the center wavelength of the pass band. Each of the resonant circuits is coupled to the adjacent one by the space intervening therebetween. With a view to providing means for adjusting the center frequency of the pass band determined by the effective electrical lengths of the respective resonator rods 25, 26 and 27, frequency-adjusting screws 251, 261 and 271, are projected adjustably inwardly from wall 22 as effective extensions of the axes of the respective resonator rods.

An input signal to be subjected to filter action is introduced into the filter by an input coaxial cable, not shown, which has its outer conductor attached to the supporting wall 21 of waveguide 20 via coupling 34 and which has its inner conductor, not shown, connected to inner conductor 32 and extension 37. The filtered output signal is taken out of the filter by an output coaxial cable, not shown, having an outer conductor attached to coupling 36 connected to wall 21 and an inner conductor connected to extension 39 comprising two portions identical with input portions 32 and 37. Inner conductor 32 extends perpendicularly inwardly from wall 21 by about one-tenth of the center wavelength of the pass band and then extension 37 extends axially inwardly along wall 21 also by about one-tenth of the center wavelength of the pass band to engage input resonator rod 25. Coupling means 39 engages output resonator rod 27. The lengths of those portions of the respective coupling means 32 and 37 and 39 which are prependicular and parallel to the axis of waveguide 20 may be selected from a wide frequency range according to a particular frequency characteristic of a given filter as desired. With a view to providing means for adjusting the degree of coupling between the successive resonance circuits, the first embodiment in FIGS. 1 and 2 still further comprises coupling-adjusting screws 256 and 267 which are adjustably inwardly projected from wall 22 of the waveguide 20 at nearly central points between the neighboring pairs of resonator rods 251 and 261, and 261 and 271, respectively.

Referring to FIG. 3 a second embodiment of this invention comprises, instead of the frequency-adjusting screws 251, 261 and 271 and the coupling-adjusting screws 256 and 267 of the first embodiment in FIGS. 1 and 2: frequency-adjusting screws 251', 261' and 271' and coupling-adjusting screws 256' and 267', in the manner of the corresponding screws in FIG. 1, projecting inwardly adjustably from wall 41, for example, of waveguide 20 perpendicularly to the axes of the respective resonator rods 25, 26 and 27. It is also apparent that screws 251', 256', 261', 267' and 271' may be similarly mounted in waveguide wall 42 if it is so desired.

For a filter of this invention, the center wavelength of the pass band is determined by the length of the quarter-wavelength resonator rods 25, 26 and 27 while the frequency characteristic is determined by the distances between the facing side surfaces of the successive resonator rods 25, 26 and 27. The frequency-adjusting and the coupling-adjusting screws, respectively, in FIGS. 1, 2 and 3 may be composed of metal, dielectric, or the like having electric conductive outer surfaces. Although the frequency-adjusting screws, such as 251 and the like, provide a wider range of frequency adjustment when placed nearer to the respective free ends of the associated resonator rods 25 and the like, it is noted that too wide of an adjustment of the resonance frequency resulting from the adjustment of the frequency-adjusting screws to several hundred percent of the frequency prescribed by the resonator rods, augments the loss for the electromagnetic waves of the frequency spaced wide from the original center frequency of the pass band. Coupling-adjusting screws 256 and the like also provide a wider range of the coupling degree when situated nearer to the free ends of the adjacent resonator rods 25 and the like.

Referring to FIG. 4, a third embodiment of this invention comprises quarter-wavelength resonator rods 26', and 25' and 27', not shown, which correspond with rods 26, 25 and 27, respectively, in FIG. 1 and whose lengths project inwardly perpendicularly from wall 21 of rectangular waveguide 20. The length of rods 25', 26' and 27' are adjustable by means of threaded end portions or equivalent end portions. With this third embodiment, it is possible to adjust the center frequency of the filter pass band over a wide frequency range without requiring a use of the frequency-adjusting screws 251 or 251' and the like, described in conjunction with the first and the second embodiments and without causing any increase in loss in the desired pass band. Although no coupling-adjusting screws 251 and 251' and the like are illustrated in FIG. 4, it is understood that such screws may additionally be used in the third embodiment to adjust the frequency characteristic of the filter thereof if it is so desired.

Referring to FIG. 5, a fourth embodiment of this invention comprises, in place of the resonator rods 26 or 26' and 25 or 25' and 27 or 27', not shown, of uniform diameter described in connection with the first through the third embodiments: quarter-wavelength resonator rods 26" and 25" and 27", not shown, corresponding with rods 26, 25 and 27, respectively, in FIG. 1. Each of rods 26", 25" and 27" has a plurality of identical annular grooves 26m. Selection of the depth and the width of each groove 26m makes it possible to furnish resonator rod 26" and the like with the desired electric length and thereby to set the resonance frequency of the resonance circuit at the frequency which is only attainable with a resonator rod of longer physical length. Grooves of comparable depth and width are provided in rods 25" and 27", not shown, for a similar purpose. In practice, resonator rod 26" may be made by integrally attaching to a rod member made of electric conductive material at least on its surface portion a plurality of annular members which are made of electric conductive material at least on their inner and outer surface portions and which have a common inner diameter equal substantially to the diameter of the rod member, in such a manner that the surfaces of the annular members may be in electric contact with the surface of the rod member. Incidentally, the grooves 26m may not be identical in shape to one another and may comprise one or more in number. The fourth embodiment also may be furnished with the respective frequency-adjusting and/or the coupling-adjusting screws shown and described above in connection with FIG. 1. As is readily apparent, the grooved structure of the rod 26" makes it possible to shorten the axial length of the rod while the virtual electric length thereof is retained to thus enable the waveguide filter of FIGURE 1 to be miniaturized.

Referring to FIG. 6, a fifth embodiment of this invention comprises, in lieu of the resonator rods 26, 26' and 26", and the like, of the same diameter: quarter-wavelength resonator rods 26''', 27''', and so on of various diameters arranged with a given spacing between the axes of the successive resonator rods 26''' and 27''' or the like. With this fifth embodiment, it is possible to vary over a wide range the degree of coupling between the successive resonance circuits and hence the frequency characteristic of the filter by varying the diameters of the resonator rods 26''', 27''' and the like. It is also possible to furnish the resonator rods of the fifth embodiment with the coupling-adjusting screws shown in FIG. 1 and the grooves shown in FIG. 5.

In the above description, resonator rods 26, 26', 26", and 26''' and the like have been provided with an electric length of about a quarter of the center wavelength within the pass band of the filter. This electric length, however, may be an integral multiple of such quarter wavelength. In particular, it is desirable to select and odd multiple of such quarter wavelength for the electric length in case a band pass filter is desired.

Figure 8:
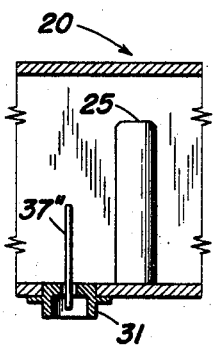
Figure 9:
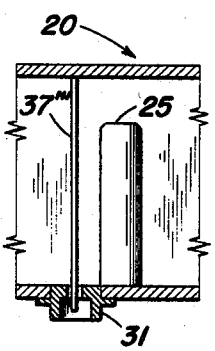
Figure 10:
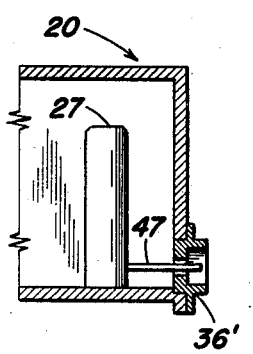

Referring now to FIGS. 7 through 10, the coupling between the filter, to which this invention is applicable and the input or the output coaxial cable, not shown, may assume, instead of the form of the coupling means 32 and 37 or 39 described in connection with the first embodiment shown in FIG. 1, other forms such as, for example, coupling 37', 37" or 37''', illustrated in FIGS. 7 through 9, respectively. In case the input or the output coaxial cable should be attached to the filter extended axially of rectangular waveguide 20, it is possible to extend its inner conductor coupling means 47 axially of the waveguide 20 in the manner shown in FIG. 10 at a height complying with the desired degree of coupling and to attach its outer conductor coupling end portion 36' to the end wall of waveguide 20.

Figure 11:
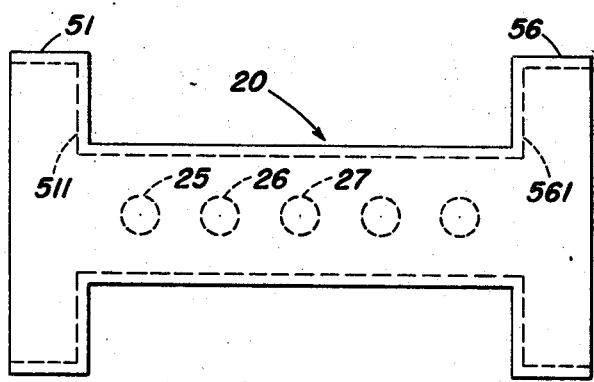
FIG. 11 is a top view of a sixth embodiment of the invention in FIGS. 1 and 2.

Referring to FIG. 11, a sixth embodiment of this invention comprises input and output waveguides 51 and 56, respectively, formed integrally with waveguide 20, instead of the input and output coaxial cables used in FIG. 1. In FIG. 11, the couplings between the input end quarter-wavelength resonator rod 25 and the input waveguide 51 and between the corresponding resonator rod on the output end and the output waveguide 56 are determined by the respective distances between the surface of end wall 511 of input waveguide 51 and the surface of input resonator rod 25 nearest to end wall 511 and between the surface of a similar end wall 561 of output waveguide 56 and the surface of the output end resonator rod nearest to end wall 561.

Figure 12:
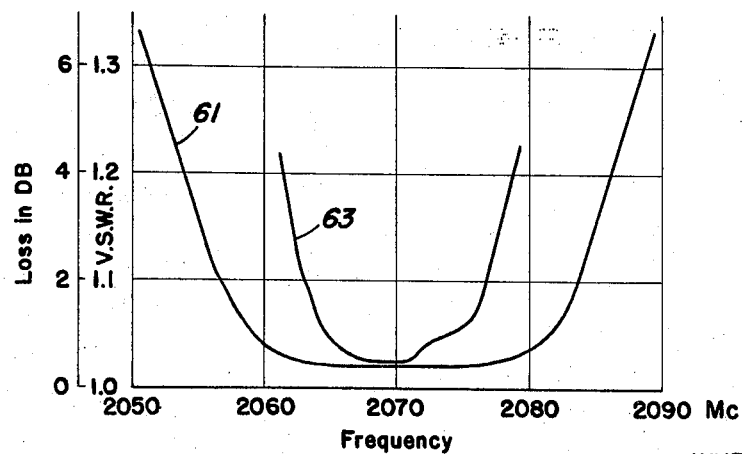
FIG. 12 shows loss-frequency and VSWR-frequency characteristics of a high-frequency filter according to the present invention.

Referring to FIG. 12 wherein the abscissa and the ordinate represent frequency and loss and VSWR (voltage standing wave ratio), respectively, a filter for a center frequency of 2.070 mc., made according to this invention into the type shown by FIGS. 1 and 2 and including a rectangular waveguide IEC–R–40 and three resonator rods of a diameter of 3.5 mm. and of a length of 31 mm., has the loss and the VSWR illustrated by curves 61 and 63, respectively. In such case, the shape of the coupling means 32 and 37 and 39 in FIG. 1 and the like and the spacing between the successive resonator rods 25, 26 and 27 in FIG. 1 make the quality factors of the end resonance circuits and the intermediate resonance circuits equal to about 35 and 70, respectively. According to curves 61 and 63, the attainable quality factor of each resonance circuit in FIG. 1, for example, is about 3,000 at the maximum.

It is understood that the cross section of the waveguide or tube, made of electric conductive material at least at its inside surface, may be other than rectangular in shape. As other illustrations, the waveguide may be a circle, an ellipse, or other shape. The quarter-wavelength resonator rods need not be arranged parallel, but on a twisted surface, and the resonator rods may be supported so as not to contact electrically with the inside surface of the waveguide or the equivalent tube in case the electric length of such rods is preferably equal to a half of the center wavelength of the pass band of the filter.

It is understood that the invention herein is described in specific respects for the purpose of this description. It is also understood that such respects are merely illustrative of the application of the principles of the invention. Numerous other arrangements may be devised by those skilled in the art without departing from the spirit and scope of the invention.

What is claimed is:
1. A microwave filter comprising:
   a hollow waveguide having a predetermined cut-off frequency band; and
   a plurality of conductive rods disposed perpendicularly on one wall of said waveguide in the interior thereof and having axes arranged in parallel and separated by predetermined distances along said one waveguide wall on an axis of said waveguide, said rods having electric lengths equal to a preselected multiple of a quarter wavelength of a certain frequency wavelength within said cut-off frequency band, each of said rods having at least one peripheral groove spaced along the axis thereof, each of said grooves having such depth and width as to provide each of said rods with a desired electric length in excess of that associated with the physical length thereof within said waveguide, each of said grooves providing each of said rods with a plurality of spaced apart annular portions;
   whereby said waveguide and rods constitute said filter having a frequency pass band whose center frequency comprises said certain frequency wavelength.

2. The filter according to claim 1 wherein each of said rods includes a plurality of peripheral grooves spaced along the axis thereof.

3. The filter according to claim 2 additionally comprising means for adjusting the resonant frequency of each of said rods, said means for adjusting the resonant frequency of each of said rods being disposed in another of said waveguide walls proximate the free ends of said rods.

4. The filter according to claim 3 additionally comprising means for adjusting the coupling between adjacent ones of said rods, said means for adjusting the coupling being disposed in a second wall of said waveguide proximate the free ends of said rods, said means for adjusting the coupling being positioned in said second wall at a location intermediate the projection of said axes of said adjacent ones of said rods and on said second wall.

References Cited

UNITED STATES PATENTS

| 2,594,037 | 4/1952 | Landon | 333—73 |
| 2,518,092 | 8/1950 | Sunstein | 333—73 |
| 2,749,523 | 6/1956 | Dishal | 333—73 |
| 2,510,288 | 6/1950 | Lewis. | |
| 3,353,122 | 11/1967 | Manocher. | |

HERMAN KARL SAALBACH, Primary Examiner

C. BARAFF, Assistant Examiner

U.S. Cl. X.R.

333—98